(12) United States Patent
Handa (10) Patent No.: US 6,517,165 B1
(45) Date of Patent: Feb. 11, 2003

(54) STRUCTURE OF MOTOR VEHICLE WHEEL

(75) Inventor: Akio Handa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,254

(22) Filed: Sep. 1, 2000

(30) Foreign Application Priority Data

Sep. 3, 1999 (JP) ............................................ 11-250968

(51) Int. Cl.[7] ................................................. B60B 3/16
(52) U.S. Cl. ................................................... 301/35.62
(58) Field of Search ...................... 301/35.62, 63.1, 301/65

(56) References Cited

U.S. PATENT DOCUMENTS

| | | | | |
|---|---|---|---|---|
| 1,656,220 A | * | 1/1928 | Nelson | 301/63.1 |
| 1,812,437 A | * | 5/1931 | Hunt | 301/35.62 |
| 1,997,544 A | * | 4/1935 | Eksergian | 301/35.62 |
| 4,316,637 A | * | 2/1982 | Reynolds | 301/37 R |
| 5,380,071 A | * | 1/1995 | Kier, Jr. | 301/63.1 |
| 5,533,260 A | * | 7/1996 | Kier, Jr. | 29/894.322 |
| 5,740,609 A | * | 4/1998 | Jurus | 29/894.324 |
| 5,971,496 A | * | 10/1999 | Dunning et al. | 301/35.62 |
| 6,294,130 B1 | * | 9/2001 | Hajaligol et al. | 419/31 |

FOREIGN PATENT DOCUMENTS

| | | | |
|---|---|---|---|
| EP | 0353781 A1 | * | 2/1990 |
| GB | 2080745 A | * | 2/1982 |
| JP | A622401 | | 1/1987 |
| JP | 409159436 A | * | 5/1997 |
| JP | 11129113 A | * | 5/1999 |

* cited by examiner

*Primary Examiner*—S. Joseph Morano
*Assistant Examiner*—Frantz F. Jules
(74) *Attorney, Agent, or Firm*—Birch, Stewart, Kolasch & Birch, LLP (57) ABSTRACT

Each aluminum alloy wheel includes a rim and a disc, and is attached to a hub of an axle by engaging bolt holes on the disc with bolts provided on the hub, and by screwing nuts into the bolts. The disc is made of a single plate, and nut seats are formed around the bolt holes and have a work hardened layer formed thereon. The disc is made of a reduced number of components compared with a wheel of the related art, and does not require any fastening member. Furthermore, no separate nut seats are necessary. This is effective in reducing the number of components and manufacturing cost.

18 Claims, 7 Drawing Sheets

STRUCTURE OF MOTOR VEHICLE WHEEL

BACKGROUND OF THE INVENTION

1. Field of the Invention

The present invention relates to the structure of an aluminum alloy wheel which can reduce manufacturing costs.

2. Description of Related Art

Japanese Utility Model Laid-Open Sho 62-2401 exemplifies an "Aluminum alloy dowel wheel." FIG. 1 of this publication shows the aluminum alloy dowel wheel, in which the dowel plate 5 is sandwiched by the two discs which are bottoms of two deep drawn cups. The outer surfaces of the two cups and dowel plate 5 are welded, and the bolt holes are formed on a flange 4 constituted by the discs of the two cups and dowel plate 5 in order to fixedly attach the wheel to the axle. Thereafter, the bushes 6 are force-fitted into the bolt hole.

In the foregoing publication, the wheel has a three-piece structure, i.e., it is constituted by the two cups and the dowel plate 5. In other words, the wheel includes a plurality of components. In order to force-fit the bush 6 into the bolt hole or weld the two cups and dowel plate 5, these components should be precisely positioned with respect to one another, and the bolt holes on the two cups and dowel plate should be aligned precisely. This means that such a wheel becomes expensive in view of manufacturing and management costs. Furthermore, the bushes are fitted into the bolt holes, which increases the number of components and manufacturing cost of the wheel.

SUMMARY OF THE INVENTION

It is therefore an object of the present invention to provide a structure of a wheel which comprises a reduced number of components and is manufactured at a reduced cost.

According to a first aspect of the present invention, a structure of a motor vehicle wheel made of an aluminum alloy includes a rim and a disc, wherein: the wheel is attached to a hub of an axle by engaging bolt holes on the disc with bolts provided on the hub and screwing nuts into the bolts, or by matching the bolt holes on the disc with internal threads provided on the hub, inserting bolts into the bolt holes and screwing the bolts into the internal threads; the disc is made by stamping a single plate; and nut seats or bolt head seats having work hardened layers are provided around the bolt holes.

The disc is made by stamping a single plate in order to reduce the number of components.

The work hardened layers of the nut seats or bolt head seats protect the aluminum alloy wheel against wear when attaching or detaching bolts or nuts.

Therefore, the number of discs is reduced compared with the wheel of the related art. No members are necessary for fastening the disc. Furthermore, no separate nut seats are required, which can reduce the number of components, manufacturing cost and management cost.

The one-piece disc can be manufactured using facilities for steel wheels, which can keep capital investment down.

According to a second aspect of the present invention, the disc is provided with weight reduction holes and ornamental holes.

The wheel becomes light in weight and is of improved external appearance.

According to a third aspect of the present invention, the nut seats or bolt head seats are curved.

Nuts or bolts having conical heads for steel wheels can be used in order to attach the wheel to the hub.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5(*a*) is a sectional view the weight reduction hole formed on the disc;

FIG. 5(*b*) is a sectional view of the ornamental hole formed on the disc;

FIGS. 7(*a*), 7(*b*) and 7(*c*) show how the nut seat is made according to the invention.

DESCRIPTION OF THE PREFERRED EMBODIMENTS

Figure 1:
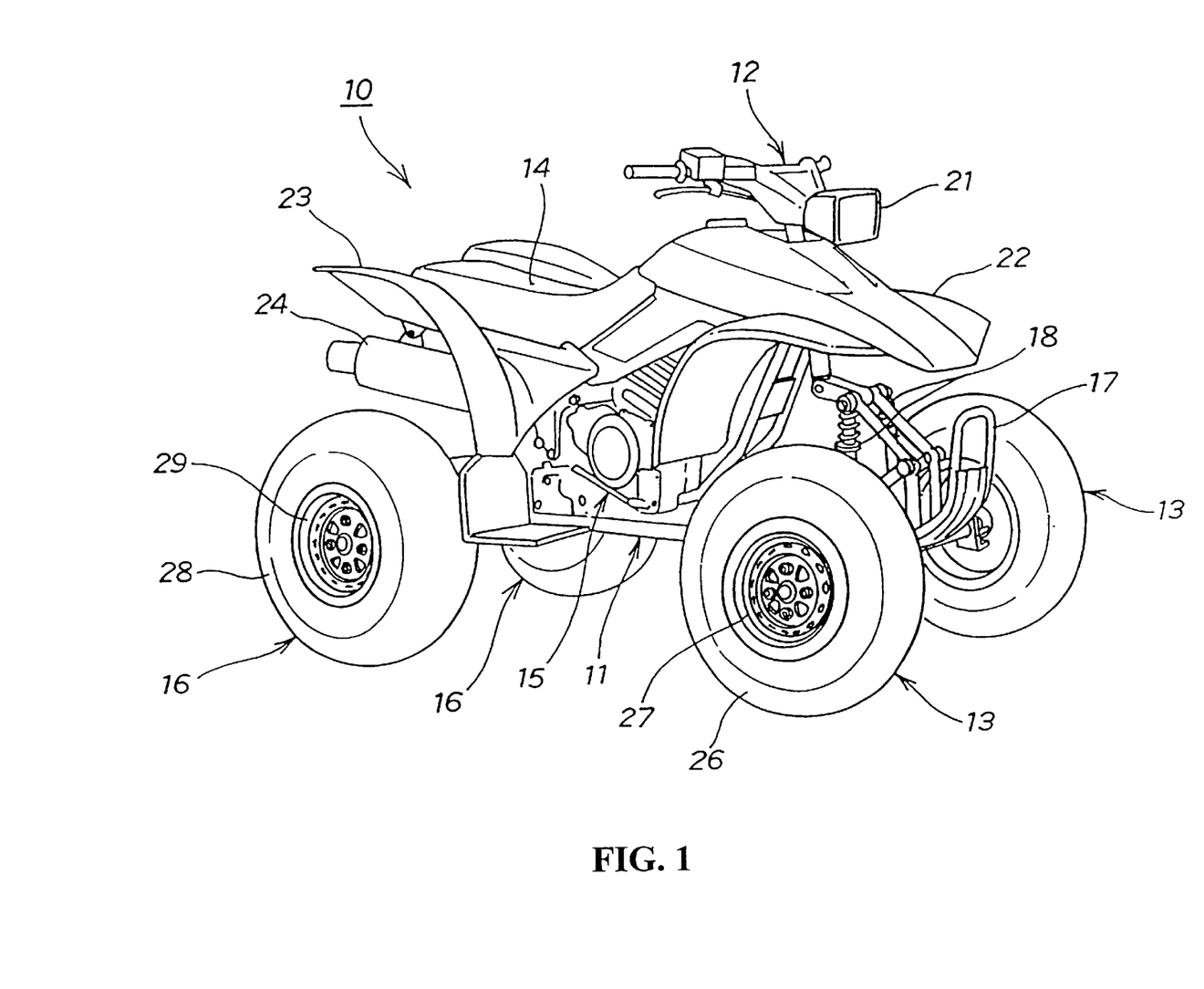
FIG. 1 is a perspective view of the motor vehicle including the wheels according to the present invention.

The invention will now be described with reference to an embodiment shown in the accompanying drawings. FIG. 1 is a perspective view of a motor vehicle 10 to which the wheel structure of the present invention is applied.

The motor vehicle 10 is an all-terrain vehicle (ATV) such as a buggy, for example, includes a light and compact body frame, can smoothly run, move or turn in small spaces, and is easy to operate, e.g., it is an off-road vehicle providing good mobility for farming, cattle breeding, hunting, safety control, and leisure.

The all-terrain vehicle 10 (called the "vehicle 10" hereinafter) comprises: a handlebar 12 movably coupled to a body frame 11; a pair of front wheel units 13 connected to the handlebar 12 so as to be steered; a seat 14 attached on the body frame 11; a power unit 15 including an engine and a transmission, and arranged below the seat 14; and a pair of rear wheel units 16 driven by the power unit 15. The vehicle 10 further includes a bumper 17, a pair of front suspension units 18, a headlamp 21, a front mudguard 22, a rear mudguard 23, and a muffler 24.

Each of the front wheel units 13 includes a tire 26 and an aluminum alloy wheel 27 according to the present invention, while each of the rear wheel units 16 includes a tire 28 and an aluminum alloy wheel 29 according to the present invention.

The front and rear wheels 27 and 29 may be identical. Alternatively, they may be different in offsets, rim diameters, rim widths, and so on. They are assumed to have the same structure in the present invention.

Figure 2:
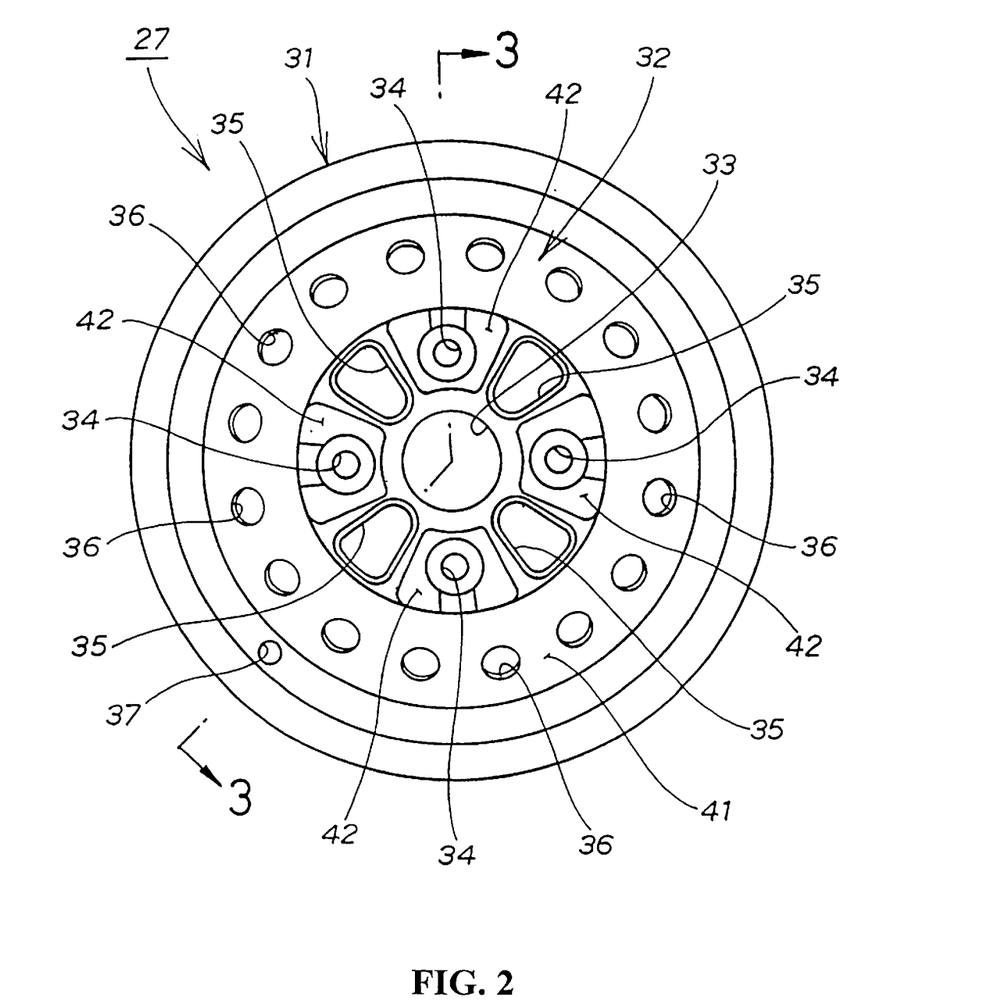
FIG. 2 is a front view of the front wheel according to the invention.

The following mainly describes the structure of the front wheel 27. FIG. 2 is a front view of the front wheel 27 comprising a rim 31 and a disc 32. The disc 32 has: a center hole 33; a plurality of bolt holes 34 which are formed and equally spaced around the center hole 33; a plurality of weight reduction holes 35 formed between the bolt holes 34; and ornamental holes 36 formed near the peripheral edge of the disc 32 near the rim 31. The weight reduction holes 35 and ornamental holes 36 are made in order to reduce the weight of the front wheel 27. In FIG. 2, reference numeral 37 denotes a hole for attaching a valve (not shown) through which air is injected into the tire 26 (see FIG. 1).

The front wheel 27 is attached to a hub (to be described later) by engaging the bolt holes 34 with bolts (to be described later) provided on the hub of an axle. Then, nuts (to be described later) are screwed onto the bolts.

Figure 3:
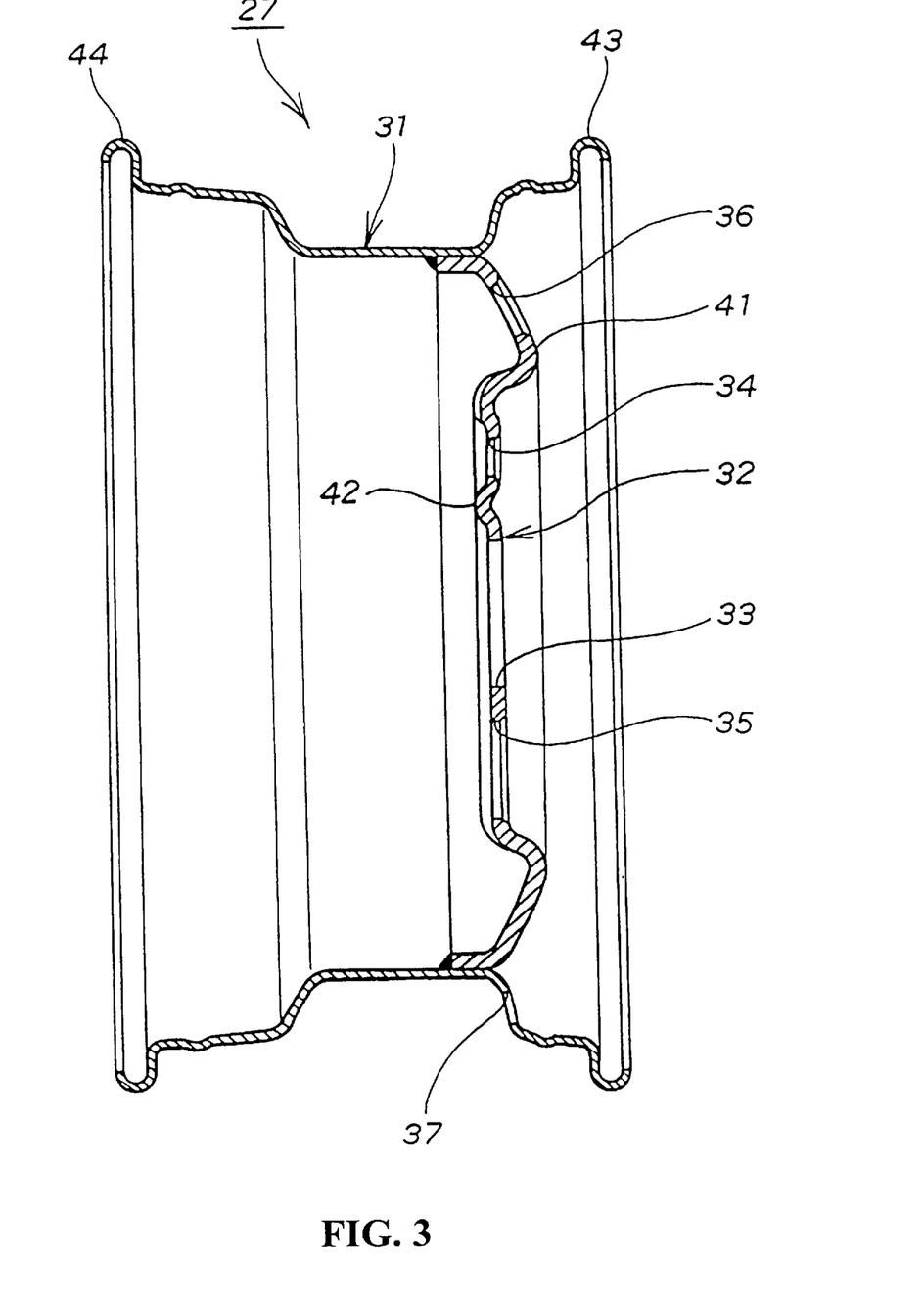
FIG. 3 is a sectional view of the front wheel, taken along line 3—3 in FIG. 2.

FIG. 3 is a sectional view of the front wheel 27, taken along line 3—3 in FIG. 2. The front wheel 27 includes the disc 32 and the rim 31. The disc 32 is made by stamping a single plate and is provided with an annular projection 41 and a hub mounting recess 42. The rim 31 and disc 32 are welded. The rim 31 also has rim flanges 43 and 44.

The disc 32 can be made by stamping the single plate in the same manner as that for stamping a steel wheel.

Figure 4:
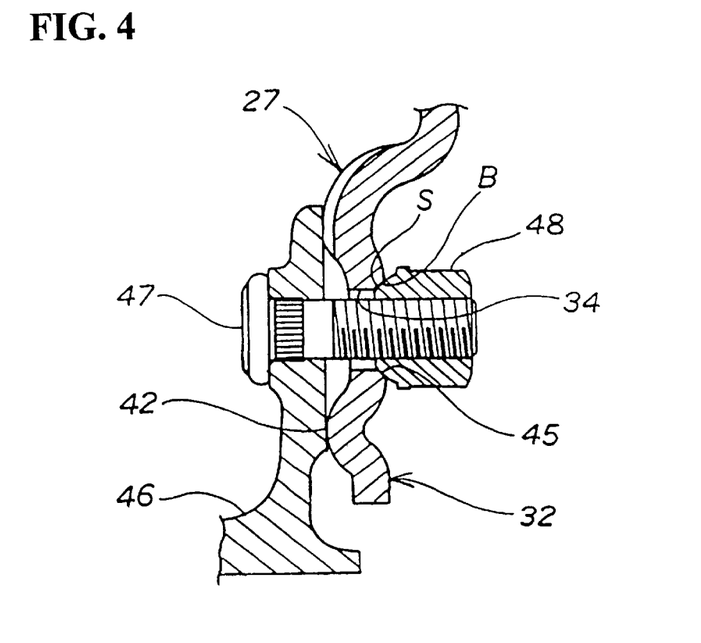
FIG. 4 is a sectional view showing how the front wheel is attached to the hub using the bolt holes on the disc.

FIG. 4 is a sectional view of the structure for mounting the front wheel to the hub using the bolt holes.

The front wheel 27 has nut seats 45 around the bolt holes 34. The nut seats 45 are subject to work hardening, and have concave surfaces B.

In FIG. 4, 46 is a hub attached to the axle, 47 is a bolt attached to the hub 46, and reference numeral 48 is a nut with a convex surface S. Each nut 48 is screwed onto the bolt 47 in order to attach the front wheel 27 to the hub 46, and the convex surface S matches with the concave surface B of the nut seat 45.

The wheel structure of the present invention features the nut seats 45 having concave surfaces.

Therefore, nuts having curved heads and used for a steel wheel are applicable to the wheels according to the present invention, which is effective in reducing the cost of a motor vehicle.

Figure 5A:
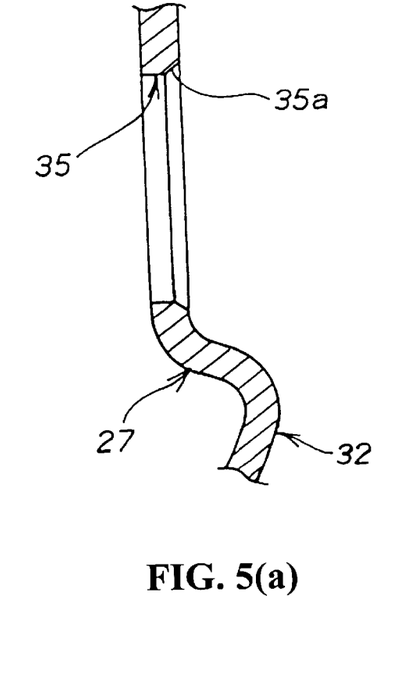
Figure 5B:
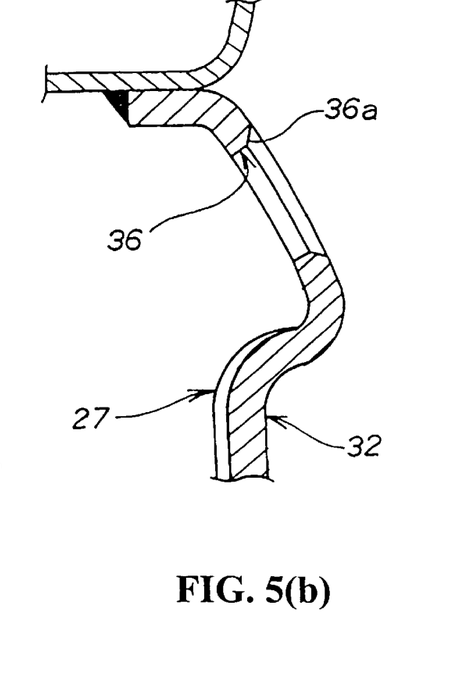

FIG. 5(a) is a sectional view of the weight reduction hole 35 on the disc 32, and FIG. 5(b) is a sectional view of the ornamental hole 36.

Referring to FIG. 5(a), the weight reduction hole 35 has a chamfered edge 35a, and also functions as an ornamental hole.

Therefore, the weight reduction hole 35 has an improved external appearance, and looks voluminous.

The ornamental hole 36 has a chamfered edge 36a, and also serves as a weight reduction hole, has an improved external appearance and looks voluminous.

As described with reference to FIGS. 5(a) and 5(b), the wheel of the invention is characterized in that the disc 32 has the weight reduction holes 35 and ornamental holes 36, which are effective in reducing the weight of the front wheel 27 and improving the external appearance thereof.

Figure 6:
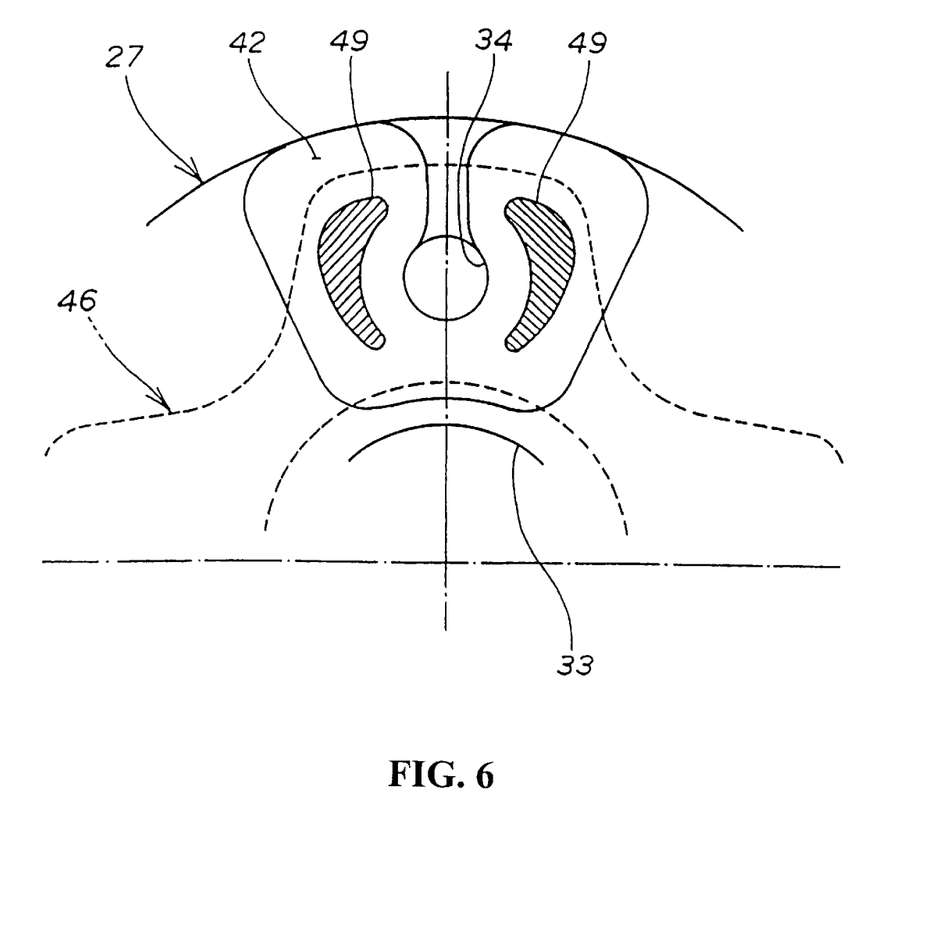
FIG. 6 shows how the wheel is brought into contact with the hub.

FIG. 6 shows how the front wheel 27 is in contact with the hub 46 according to the present invention.

When the front wheel 27 is attached to the hub 46 by tightening the nut 48 (see FIG. 4) with a predetermined torque, the rear surface of a hub mounting part 42 of the front wheel 27 is in contact with the front surface of the hub 46 at two positions (shaded in FIG. 6) in the shape of a crescent (these positions called the "crescent areas 49" hereinafter). In other words, the hub 46 and the hub mounting part 42 are in equal contact with each other at the crescent areas 49 which are symmetrical with respect to the bolt hole 34.

Therefore, the front wheel 27 can be reliably attached to the hub 46, which is effective in suppressing vibrations of the front wheel 27 during the rotation thereof.

The nut seat 45 is made in the following manner.

Figure 7A:
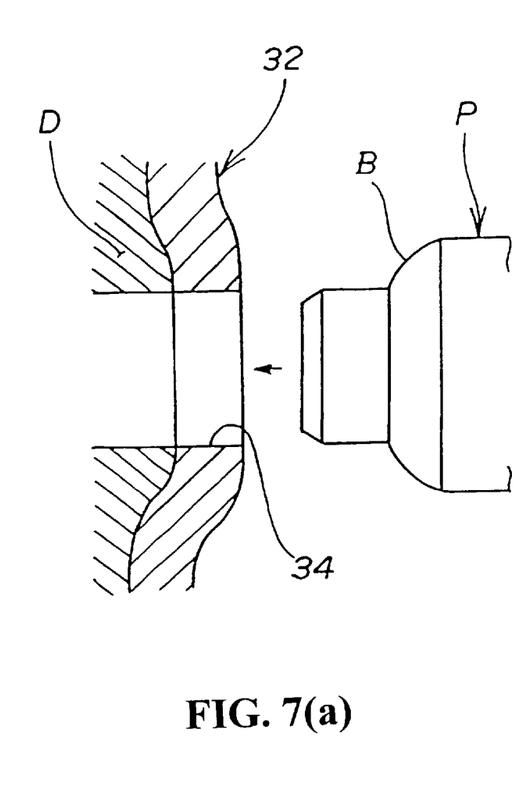
Figures 7B, 7C:
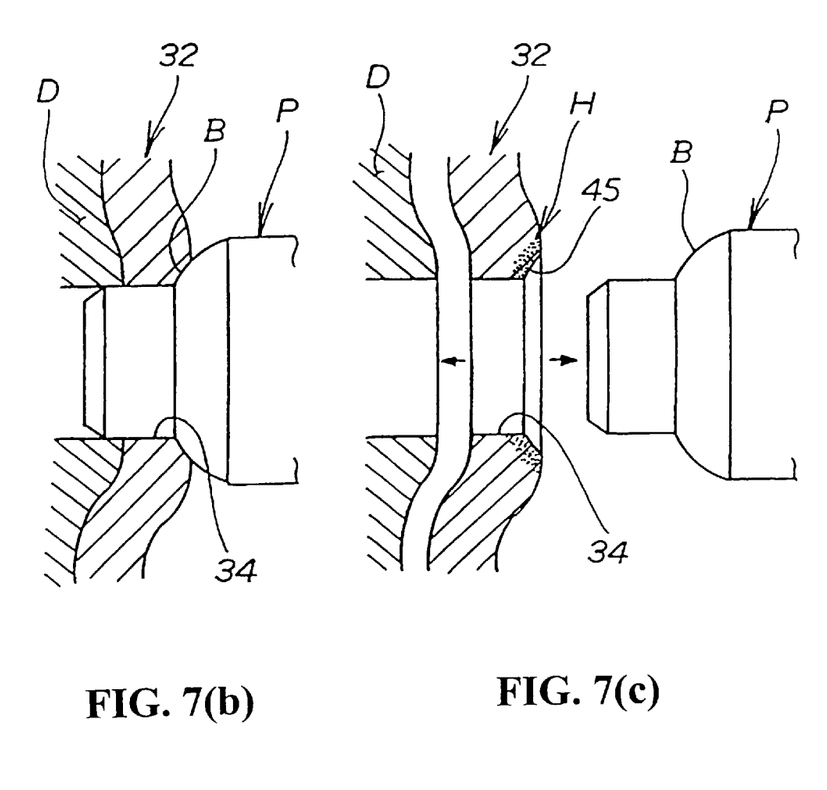

FIG. 7(a) to FIG. 7(b) show how the nut seat 45 is formed in the wheel structure according to the invention.

Referring to FIG. 7(a), a plate is stamped using a die D to obtain the disc 32. After forming the bolt holes 34 on the disc 32, a punch P having a convex surface B is moved toward the bolt hole 34.

With reference to FIG. 7(c), the die D and the punch B are removed from the disc 32.

The nut seat 45 having the concave surface B and a work hardened layer H is formed around the peripheral edge of the bolt hole 34.

Figure 8:
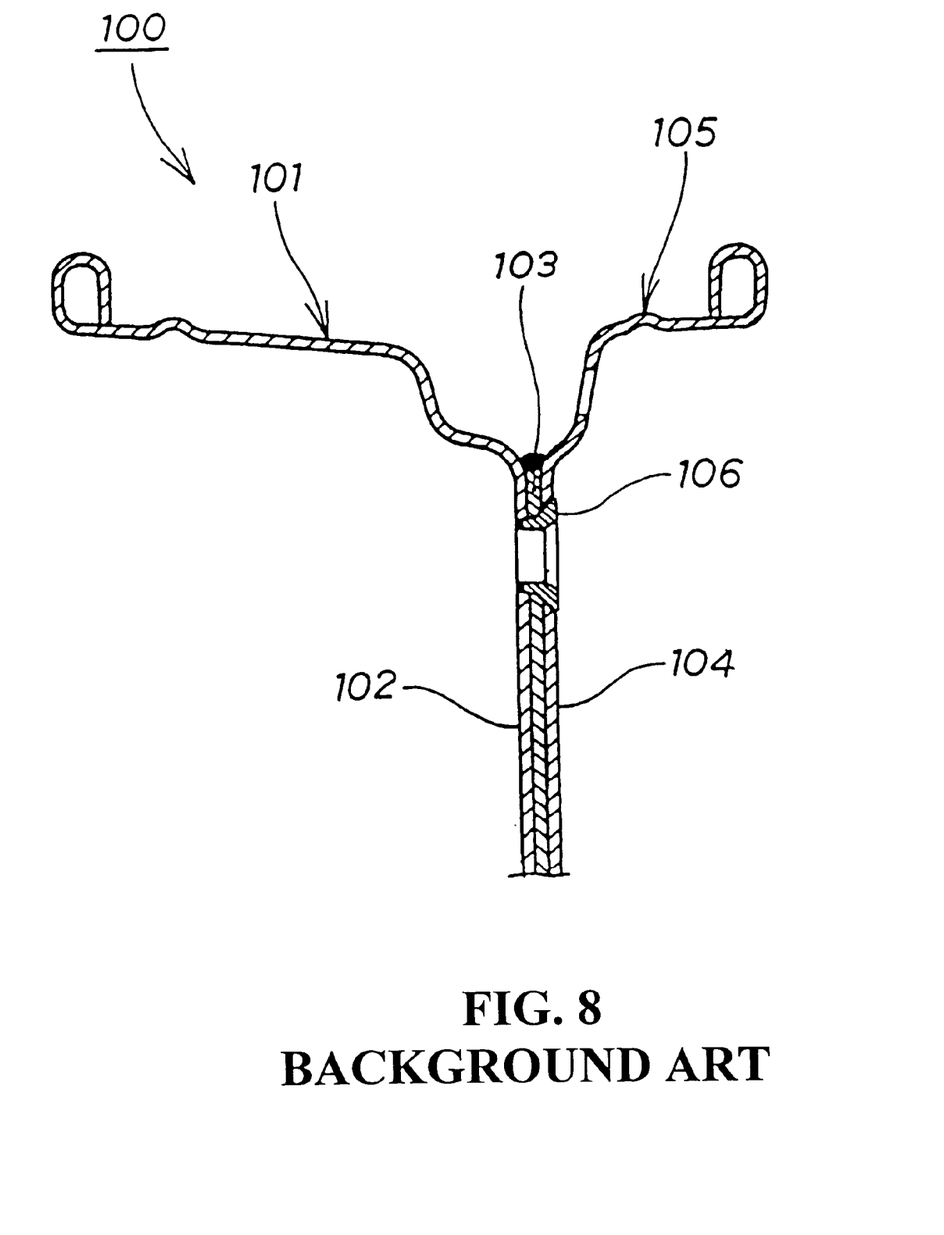
FIG. 8 is a sectional view of the comparison example of the wheel of the related art.

FIG. 8 is a sectional view of a wheel 100 of the related art provided as a comparative example. The wheel 100 has a three-piece structure, is made of a light alloy, and includes a cup-shaped inner wheel 101, a center disc 103 adjacent to a disc portion 102 of the inner wheel 101, and an outer wheel 105 having a disc portion 104 adjacent to the center disc 103. The inner and outer wheels 101 and 105 are welded to the peripheral edge of the center disc 103.

The wheel 100 is provided with steel nut seats 106 passing through the disc portion 104, center disc 103 and disc portion 102 in order to attach the wheel 100 to a hub of an axle using bolts and nuts.

The foregoing wheel 100 has a three-piece structure and includes a number of components. Therefore, when welding the three components while relatively positioning them, or when attaching the nut seat 106, many steps have to be carried out in order to align the holes formed in the inner wheel 101, center disc 103 and outer wheel 105.

Furthermore, the light alloy wheel 100 has a reduced hardness. When the nut seats are also made of a light alloy, they are extensively worn out after repeatedly attaching and detaching nuts. As a result, it is necessary to provide separate nut seats 106 made of a hard material.

When compared with the wheel 100, the front and rear wheels 27 and 29 (shown in FIG. 1) of the present invention are made of an aluminum alloy. As shown in FIG. 4, the wheels 27 and 29 are attached to the hubs 46 by engaging the bolt holes 34 of the discs 32 with the bolts 47 of the hubs 46, and screwing the nuts 48 into the bolts 47. The wheel structure of the present invention is characterized in that the disc 32 is made by stamping a single plate, and that the nut seats 45 have work hardened layers and are formed around the bolt hole 34.

In the foregoing structure, the disc 32 made of a single plate does not require any fastening member. Furthermore, this structure requires no separate nut seats which are necessary in the related art. This is effective in reducing the number of components, manufacturing cost and management cost.

Furthermore, the disc 32 can be produced using facilities for producing steel wheels, which can reduce capital investment.

In the present invention, the nut seats 45 have concave surfaces as shown in FIG. 4. Alternatively, the nut seats 45 may be tapered, subject to spot facing, or flattened, so long as they have work hardened layers.

In the foregoing embodiment, each of the wheels is attached to the hub by engaging the bolt holes of the disc with the bolts on the hub of the axle and by screwing the nuts into the bolts. The disc is made by stamping a single plate, and is provided with nut seats which are formed around the bolt holes and have work hardened layers. However, the present invention is not limited to the foregoing structure. Alternatively, the wheel may be attached to the hub by engaging the bolt holes on the disc with internal threads on the hub, fitting bolts into the bolt holes, and screwing the bolts into the internal threads. In this structure, the disc is made of a single plate, and is provided with the bolt head seats which are formed around the bolt holes and have work hardened layers.

In summary, the present invention is characterized in that the bolt seats with which bolt heads are in contact are formed around the bolt holes, and that the bolt head seats have work hardened layers.

According to the present invention, the nut seats have concave surfaces. Alternatively, the bolt head seats may have concave surfaces.

The present invention is advantageous in the following respects.

According to the first aspect of the present invention, each of the wheels is made of aluminum alloy and includes a rim and disc. The wheel is attached to the hub of the axle by engaging the bolt holes on the disc with the bolts on the hub and screwing nuts into the bolts, or by matching the bolt holes on the disc with internal threads provided in the hub, inserting bolts into the bolt holes and screwing the bolts into the internal threads. In this structure, the disc is made by stamping a single plate. Furthermore, the nut seats or bolt head seats are formed around the bolt holes, and have work hardened layers. Therefore, the disc of the present invention includes a reduced number of components compared with the disc of the related art, and does not need any fastening members. In addition, the wheel does not require any separate nut seats which are necessary in the related art. This is effective in reducing the number of components, and manufacturing cost.

According to the second aspect of the present invention, the disc has weight reduction holes and ornamental holes, which are effective in reducing the weight of the wheel and improving the external appearance thereof.

According to the third aspect of the present invention, the nut seats or bolt head seats have concave surfaces, so that nuts or bolts for a steel wheel can be used in the present invention so long as they have acorn heads. This is effective in reducing the cost of the wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure of a motor vehicle wheel made of an aluminum alloy, comprising:

a rim;

a disc attached to said rim, said disc having bolt holes formed therein and being formed from a single stamped plate, said disc including a hub mounting part formed around each of said bolt holes, said hub mounting part being formed by projections extending away from said bolt holes for engaging with a front surface of a hub of an axle, each of said projections being formed having a surface in the shape of a crescent for engaging with the front surface of the hub;

said wheel is attachable to the hub by engaging said bolt holes in the disc with bolts provided on the hub and screwing nuts onto the bolts, or by matching the bolt holes on the disc with internal threads provided on the hub, inserting headed bolts into the bolt holes and screwing the headed bolts into the internal threads; and nut seats or bolt head seats having work hardened layers are provided around the bolt holes.

2. The structure according to claim 1, wherein the disc is provided with weight reduction holes and ornamental holes formed therein.

3. The structure according to claim 2, wherein said weight reduction holes and ornamental holes have chamfered edges.

4. The structure according to claim 2, wherein the nut seats or the bolt head seats are curved.

5. The structure according to claim 4, wherein said curved nut seats or bolt head seats have concave surfaces for receiving cooperating convex surfaces of said nuts or bolts.

6. The structure according to claim 1, wherein said nut seats or the bolt head seats are curved.

7. The structure according to claim 6, wherein said curved nut seats or bolt head seats have concave surfaces for receiving cooperating convex surfaces of said nuts or bolts.

8. The structure according to claim 1, wherein said wheel is formed from only said rim and said disc, and said rim and said disc are each one piece members welded together to form said wheel.

9. The structure according to claim 1, wherein said nut seats or bolt head seats are formed as a single piece with said disc.

10. The structure according to claim 1, wherein only said nut seats or bolt head seats have work hardened layers.

11. A method of making a motor vehicle wheel comprising the steps of:

stamping a single plate of aluminum alloy material with a die to form a disc;

forming bolt holes in said disc;

forming said disc with a hub mounting part around each of said bolt holes, said hub mounting part being formed by projections extending away from said bolt holes, each of said projections having a surface in the shape of a crescent;

pressing a punch toward edges of said bolt holes to form a nut or bolt head seat around a periphery of said bolt holes; and forming a work hardened layer on said nut or bolt head seats.

12. The method according to claim 11, further comprising the steps of:

forming a rim from a single piece of material; and welding said disc to said rim.

13. The method according to claim 11, further comprising the step of forming weight reduction holes and ornamental holes in said disc.

14. The method according to claim 13, wherein said step of forming weight reduction holes and ornamental holes includes the step of forming chamfered edges around said weight reduction holes and ornamental holes.

15. The method according to claim 11, wherein said step of pressing includes the step of forming said nut seats or bolt head seats curved.

16. The method according to claim 15, wherein said step of pressing includes the step of forming said curved nut seats or bolt head seats having concave surfaces.

17. The method according to claim 11, wherein said step of forming the work hardened layer comprises forming said work hardened layer only on said nut or bolt head seats.

18. The method according to claim 11, wherein said step of forming the work hardened layer comprises pressing a punch to an edge of the bolt holes.

* * * * *